(12) United States Patent
Jeong

(10) Patent No.: US 11,752,996 B2
(45) Date of Patent: Sep. 12, 2023

(54) SYSTEM AND METHOD FOR CONTROLLING POWER CONSUMPTION OF HIGH VOLTAGE BATTERY

(71) Applicants: Hyundai Motor Company, Seoul (KR); Kia Corporation, Seoul (KR)

(72) Inventor: Seok Min Jeong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 83 days.

(21) Appl. No.: 17/376,849

(22) Filed: Jul. 15, 2021

(65) Prior Publication Data

US 2022/0144243 A1 May 12, 2022

(30) Foreign Application Priority Data

Nov. 9, 2020 (KR) .................... 10-2020-0148273

(51) Int. Cl.
*B60W 20/10* (2016.01)
*B60L 3/00* (2019.01)
*B60W 10/08* (2006.01)
*B60W 10/26* (2006.01)

(52) U.S. Cl.
CPC .............. *B60W 20/10* (2013.01); *B60L 3/00* (2013.01); *B60W 10/08* (2013.01); *B60W 10/26* (2013.01); *B60W 2540/10* (2013.01); *B60W 2710/083* (2013.01)

(58) Field of Classification Search
CPC ...... B60W 20/10; B60W 10/08; B60W 10/26; B60W 2540/10; B60W 2710/083; B60L 3/00
See application file for complete search history.

(56) References Cited

U.S. PATENT DOCUMENTS

| | | | | |
|---|---|---|---|---|
| 6,362,536 | B1* | 3/2002 | Izumiura | B60K 6/485 290/40 C |
| 8,692,496 | B2* | 4/2014 | McGrogan | B60L 58/15 318/434 |
| 9,714,028 | B1* | 7/2017 | Moon | B60W 20/50 |
| 2006/0021809 | A1* | 2/2006 | Xu | B60W 10/26 180/65.245 |
| 2007/0227791 | A1* | 10/2007 | Ueno | B60W 20/20 180/65.245 |

(Continued)

FOREIGN PATENT DOCUMENTS

KR 101587658 B1 1/2016

*Primary Examiner* — Carl C Staubach

(74) *Attorney, Agent, or Firm* — Slater Matsil, LLP

(57) ABSTRACT

An embodiment system for controlling power consumption of a high voltage battery includes a driver's requested torque determiner configured to determine a driver's intention to accelerate a vehicle and to calculate a driver's requested torque, an available power amount calculator configured to calculate an available power amount of a difference between an existing power consumption amount of electronic components configured to use the high voltage battery as a power source and a minimum power consumption amount of the electronic components required by a vehicle system, and a driving controller configured to variably control power applied to the electronic components and power applied to a drive motor of the vehicle upon determining the driver's intention to accelerate the vehicle.

18 Claims, 4 Drawing Sheets

(56) References Cited

U.S. PATENT DOCUMENTS

2015/0066265 A1\* 3/2015 Martin .............. B60W 30/1882
477/3
2022/0055602 A1\* 2/2022 Shin ...................... B60W 20/10

\* cited by examiner

SYSTEM AND METHOD FOR CONTROLLING POWER CONSUMPTION OF HIGH VOLTAGE BATTERY

CROSS-REFERENCE TO RELATED APPLICATIONS

This application claims the benefit of Korean Patent Application No. 10-2020-0148273, filed on Nov. 9, 2020, which application is hereby incorporated herein by reference.

TECHNICAL FIELD

The present disclosure relates to a system and method for controlling power consumption of a high voltage battery.

BACKGROUND

Hybrid electric vehicles mean vehicles which travel using both an engine and a drive motor as power sources. That is, hybrid electric vehicles effectively use a combination of the power of an internal combustion engine and the power of a motor. These hybrid electric vehicles are driven in two driving modes depending upon which powertrain is operated. One mode is an electric vehicle (EV) mode in which a hybrid electric vehicle travels using only a drive motor, and the other mode is a hybrid electric vehicle (HEV) mode in which an engine is operated together with the drive motor. Hybrid electric vehicles switch between the two modes depending on conditions during driving.

When there is a driver's request to accelerate a vehicle, the hybrid electric vehicle controls a driving torque by adding the maximum torque of an engine and the available torque of a motor through kickdown. Recently, because the maximum use of the torque of the engine is limited in accordance with regulations using an auxiliary emission control device (AECD), research on realizing desired acceleration performance of the vehicle is underway. However, the conventional hybrid electric vehicle ensures only power performance through full-load control of the engine, but not the optimum air-fuel ratio of the engine, and the fuel efficiency of the hybrid electric vehicle is deteriorated due to full-load control of the engine.

The above information disclosed in this Background section is only for enhancement of understanding of the background of the invention and therefore it may contain information that does not form the prior art that is already known to a person of ordinary skill in the art.

SUMMARY

The present disclosure relates to a system and method for controlling power consumption of a high voltage battery. Particular embodiments relate to a system and method for controlling power consumption of a high voltage battery which may satisfy a driver's request to accelerate a vehicle while controlling an engine based on the optimum air-fuel ratio.

Embodiments of the present invention can solve problems associated with the prior art, and an embodiment of the present invention provides a system and method for controlling power consumption of a high voltage battery which may satisfy a driver's request to accelerate a vehicle while controlling an engine based on the optimum air-fuel ratio.

Another embodiment of the present invention provides a system and method for controlling power consumption of a high voltage battery which may satisfy a driver's requested torque by applying an available power amount, acquired by temporarily reducing a power amount consumed by electronic components, to a drive motor.

One embodiment of the present invention provides a system for controlling power consumption of a high voltage battery, the system including a driver's requested torque determiner configured to determine a driver's intention to accelerate a vehicle and to calculate a driver's requested torque, an available power amount calculator configured to calculate an available power amount which is a difference between an existing power consumption amount of electronic components configured to use the high voltage battery as a power source and a minimum power consumption amount of the electronic components required by a vehicle system, and a driving controller configured to variably control power applied to the electronic components and power applied to a drive motor of the vehicle, upon determining that there is the driver's intention to accelerate the vehicle.

In a preferred embodiment, the driving controller may variably control the power applied to the electronic components and the power applied to the drive motor of the vehicle, when the available power amount is greater than a minimum power amount which is capable of affecting driving force of the vehicle.

In another preferred embodiment, the driving controller may distribute the available power amount to the drive motor so as to increase a torque of the drive motor, when a sum of a current torque of the drive motor, a torque generated by applying the available power amount to the drive motor, and a maximum torque of the engine is greater than the driver's requested torque.

In still another preferred embodiment, the maximum torque of the engine may be the maximum torque of the engine at a time of partial-load control of the engine, defined in advance depending on an RPM of the engine.

In yet another preferred embodiment, the driving controller may apply a portion of the available power amount to the drive motor so that the drive motor generates a torque corresponding to a value, acquired by subtracting the maximum torque of the engine from the driver's requested torque, and the driving controller may apply a remaining portion of the available power amount to an HSG.

In still yet another preferred embodiment, the driving controller may distribute the available power amount to the drive motor so as to increase a torque of the drive motor and to satisfy the driver's requested torque through full-load control of the engine, when a sum of a current torque of the drive motor, a torque generated by applying the available power amount to the drive motor, and a maximum torque of the engine is less than the driver's requested torque.

In a further preferred embodiment, the driving controller may apply power corresponding to the minimum power consumption amount to the electronic components, upon determining that there is the driver's intention to accelerate the vehicle.

In another further preferred embodiment, the driver's requested torque determiner may determine whether or not there is the driver's intention to accelerate the vehicle based on an absolute value of or a change in an extent of operation of an accelerator pedal by a driver.

In still another further preferred embodiment, the driver's requested torque determiner may determine that there is the driver's intention to accelerate the vehicle, when the extent of operation of the accelerator pedal is equal to or greater than a predetermined limit value or the change in the extent of operation of the accelerator pedal per hour is equal to or greater than a predetermined limit change value.

In yet another further preferred embodiment, the driver's requested torque determiner may finally determine the driver's requested torque in consideration of a corrected torque calculated from a driving torque, determined depending on an open value of an APS and a speed of the vehicle, based on an environment of a driving road.

In still yet another further preferred embodiment, the driver's requested torque determiner may determine that the driver's intention to accelerate the vehicle is released, when an extent of operation of an accelerator pedal is less than a predetermined limit value or a change in the extent of operation of the accelerator pedal per hour is less than a predetermined limit change value.

In a still further preferred embodiment, the driving controller may apply power corresponding to the existing power consumption amount of the electronic components to the electronic components, upon determining that the driver's intention to accelerate the vehicle is released.

In a yet still further preferred embodiment, the available power amount calculator may calculate the minimum power consumption amount of the electronic components based on a difference between a set value and a current value of a parameter for controlling the electronic components.

Another embodiment of the present invention provides a method for controlling power consumption of a high voltage battery, the method including determining a point in time of a driver's request to accelerate a vehicle and calculating a driver's requested torque, calculating an existing power consumption amount of electronic components configured to use the high voltage battery as a power source and a minimum power consumption amount of the electronic components required by a vehicle system, calculating an available power amount which is a difference between the existing power consumption amount of the electronic components and the minimum power consumption amount of the electronic components, and controlling the electronic components based on the minimum power consumption amount of the electronic components, and controlling power applied to a drive motor of the vehicle based on the available power amount.

In a preferred embodiment, the calculating the available power amount may include determining whether or not the available power amount is greater than a minimum power amount which is capable of affecting driving force of the vehicle, and the power applied to the electronic components and the power applied to the drive motor of the vehicle may be variably controlled, when the available power amount is greater than the minimum power amount.

In another preferred embodiment, controlling the power applied to the drive motor of the vehicle may include distributing the available power amount to the drive motor so as to increase a torque of the drive motor, when a sum of a current torque of the drive motor, a torque generated by applying the available power amount to the drive motor, and a maximum torque of the engine is greater than the driver's requested torque, and the maximum torque of the engine may be the maximum torque of the engine at a time of partial-load control of the engine, defined in advance depending on an RPM of the engine.

In still another preferred embodiment, distributing the available power amount to the drive motor so as to increase the torque of the drive motor may include applying a portion of the available power amount to the drive motor so that the drive motor generates a torque corresponding to a value, acquired by subtracting the maximum torque of the engine from the driver's requested torque, and applying a remaining portion of the available power amount to an HSG.

In yet another preferred embodiment, controlling the power applied to the drive motor of the vehicle may include distributing the available power amount to the drive motor so as to increase a torque of the drive motor and to satisfy the driver's requested torque through full-load control of the engine, when a sum of a current torque of the drive motor, a torque generated by applying the available power amount to the drive motor, and a maximum torque of the engine is less than the driver's requested torque.

In still yet another preferred embodiment, the determining the point in time of the driver's request to accelerate the vehicle and calculating the driver's requested torque may include determining that there is a driver's intention to accelerate the vehicle, when an extent of operation of an accelerator pedal is equal to or greater than a predetermined limit value or a change in the extent of operation of the accelerator pedal per hour is equal to or greater than a predetermined limit change value.

In a further preferred embodiment, the method may further include changing a power consumption amount applied to the electronic components to the existing power consumption amount of the electronic components, upon determining that the driver's request to accelerate the vehicle is released.

Other aspects and preferred embodiments of the invention are discussed infra.

The above and other features of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1:
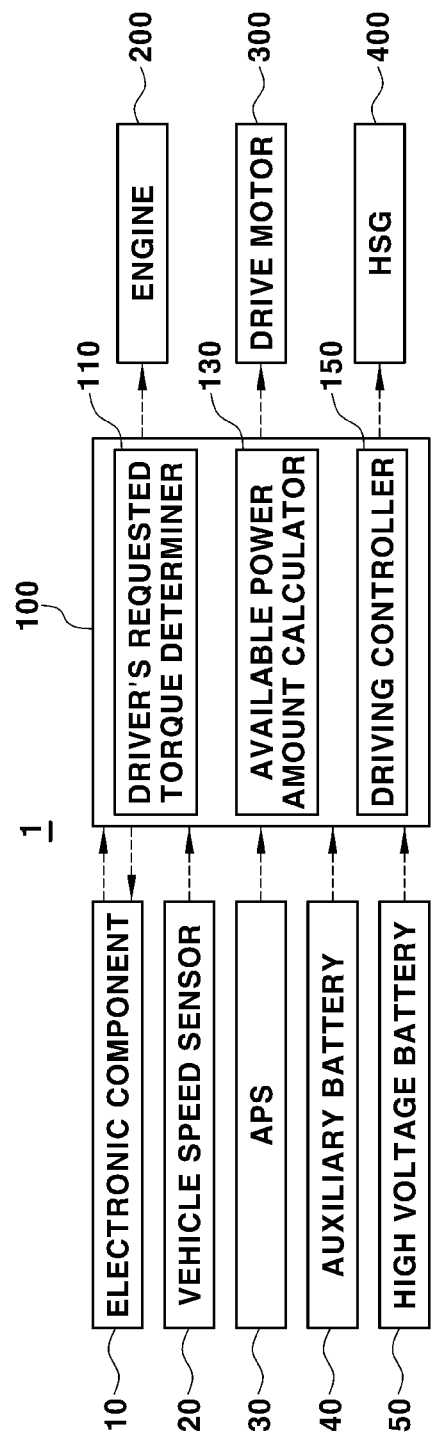
FIG. 1 is a block diagram illustrating a system for controlling power consumption of a high voltage battery according to one embodiment of the present invention.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Advantages and features of embodiments of the present invention and methods for achieving the same will become apparent from the descriptions of embodiments given herein below with reference to the accompanying drawings. However, the present invention is not limited to the embodiments disclosed herein and may be implemented in various different forms. The embodiments are provided to make the description of the present invention thorough and to fully convey the scope of the present invention to those skilled in the art. It is to be noted that the scope of the present invention is defined only by the claims. In the following description of the present invention, the same or similar elements are denoted by the same reference numerals even when they are depicted in different drawings.

In the following description of the embodiments, it will be understood that the suffixes "part", "unit" and "module" indicate units for processing at least one function or operation, and may be implemented using hardware, software, or a combination of hardware and software.

Further, in the following description of the embodiments, terms, such as "first" and "second", are used only to distinguish one element from other elements, and these terms should not be construed as being limiting with regard to the sequence thereof.

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims. In addition, the claims disclosed herein are to be interpreted as encompassing other embodiments.

Figure 2:
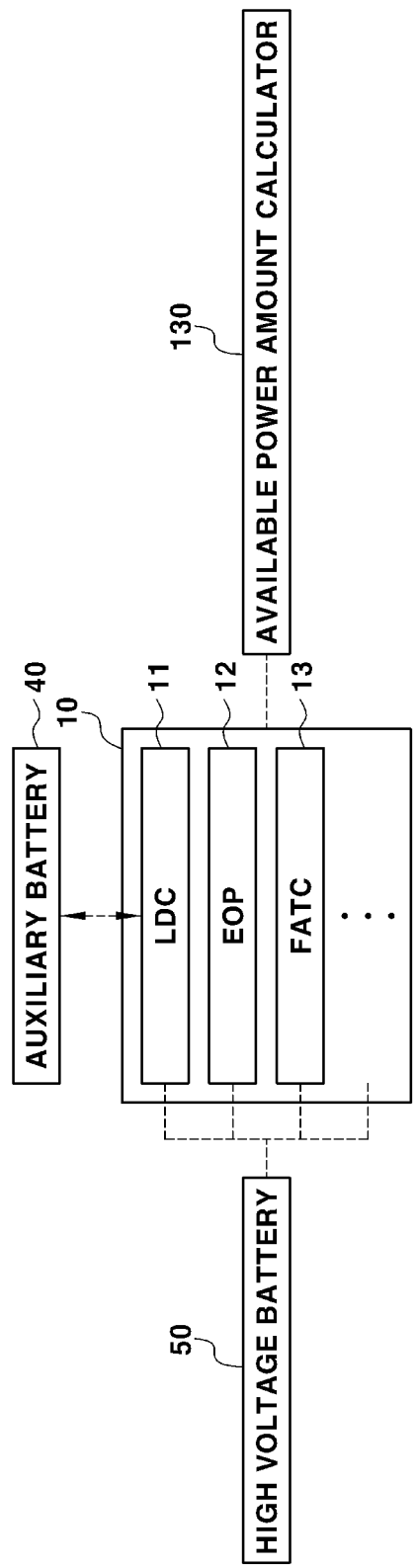
FIG. 2 is a block diagram illustrating electronic components according to one embodiment of the present invention.

FIG. 1 is a block diagram illustrating a system for controlling power consumption of a high voltage battery according to one embodiment of the present invention, and FIG. 2 is a block diagram illustrating electronic components according to one embodiment of the present invention.

Referring to FIGS. 1 and 2, a system 1 for controlling power consumption of a high voltage battery 50 according to one embodiment of the present invention may distribute the power of the high voltage battery 50, which is consumed by electronic components 10, to a drive motor 300 in order to improve the acceleration performance of a vehicle. For this purpose, the system 1 may collect various information regarding components of the vehicle, and the collected information may be processed by a controller 100. For example, the controller 100 may be a hybrid control unit (HCU). Embodiments of the present invention relate to a system 1 for controlling the power consumption of the high voltage battery 50 applied to a hybrid electric vehicle (HEV) or a plug-in hybrid electric vehicle (PHEV) to which both an engine 200 and a drive motor 300 are applied.

Components which consume the power of the high voltage battery 50 are commonly called electronic components 10, and the electronic components 10 may mean components other than elements necessary to generate driving force of the vehicle. For example, the electronic components 10 may include a low DC-DC converter (LDC) 11, an electric oil pump (EOP) 12, a full automatic temperature controller (FATC) 13, etc.

The LDC 11 may convert DC high voltage, supplied from the high voltage battery 50, into DC low voltage, and supply the DC low voltage to a plurality of electric loads, which use the DC low voltage, as power. Particularly, the LDC 11 may charge an auxiliary battery 40. The LDC 11 may detect the input voltage and input current of the electric loads which use the DC low voltage, and transmit signals thereof to the controller 100. The controller 100 may calculate power consumed by the electric loads including the auxiliary battery 40, which use the DC low voltage.

The EOP 12 may pump and supply oil necessary to drive an engine clutch and a transmission. The EOP 12 may receive power through the high voltage battery 50. The input voltage and input current of the EOP 12 may be detected by an oil pump controller, and signals thereof may be transmitted to the controller 100.

The FATC 13 may control driving of an air conditioning system. The FATC 13 may receive power through the high voltage battery 50. The FATC 13 may detect the input voltage and input current of the air conditioning system, and transmit signals thereof to the controller 100.

A vehicle speed sensor 20 may measure information regarding the speed of the vehicle. The measured speed of the vehicle may be transmitted to the controller 100.

An accelerator position sensor (APS) 30 may detect the extent of depression of an accelerator pedal by a driver. The APS 30 may measure the position value of the accelerator pedal (the extent of depression of the accelerator pedal) and transmit a signal therefor to the controller 100.

The auxiliary battery 40 may supply power to various controllers, an audio device, lighting devices, door locks, etc. of a hybrid electric vehicle. The auxiliary battery 40 may be charged by power resulting from conversion by the LDC 11 of power, output from the high voltage battery 50. A target output voltage output from the LDC 11 may be set to decrease as the state of charge (SOC) of the auxiliary battery 40 increases, and thereby, the charge amount of the auxiliary battery 40 may be reduced. That is, the LDC 11 may control the charge amount of the auxiliary battery 40 according to the SOC of the auxiliary battery 40.

The high voltage battery 50 may provide power to operate the drive motor 300. Further, the high voltage battery 50 may provide power to the electronic components 10 of embodiments of the present invention. The high voltage battery 50 may be charged by a hybrid starter generator (HSG) 400 operated by the engine 200, or charged through regenerative braking of the hybrid electric vehicle. If the hybrid electric vehicle is a plug-in hybrid electric vehicle, the high voltage battery 50 may be charged directly by a charger.

The controller 100 may control a torque applied to the engine 200 based on the various information regarding the vehicle, and control power amounts applied to the electronic components 10, the drive motor 300 and the HSG 400. The controller 100 may minimize the power amount applied to the electronic components 10 which use the power stored in the high voltage battery 50, and may satisfy a driver's request to accelerate the vehicle by applying an available power amount acquired thereby to the drive motor 300. The controller 100 may include a driver's requested torque determiner no, an available power amount calculator 130, and a driving controller 150. The driver's requested torque determiner no, the available power amount calculator 130, and the driving controller 150 may be elements which are divided from each other depending on the functions thereof in the controller 100.

The driver's requested torque determiner 110 may determine a driver's intention to accelerate the vehicle, and calculate a driver's requested torque. The driver's requested torque determiner no may determine the driver's intention to accelerate the vehicle based on a change in the driving mode of the vehicle or the absolute value of or a change in the extent of operation of the accelerator pedal by the driver. More precisely, the driver's requested torque determiner no may determine that there is the driver's intention to accelerate the vehicle, when the driving mode of the vehicle is changed from an eco-mode, a comfort mode or a normal mode to a sport mode. Further, the driver's requested torque determiner no may determine that there is the driver's intention to accelerate the vehicle, when the extent of operation of the accelerator pedal is equal to or greater than a predetermined limit value or a change in the extent of operation of the accelerator pedal per hour is equal to or greater than a predetermined limit change value. That is, the driver's requested torque determiner no may determine the driver's intention to accelerate the vehicle based on the extent of operation of the accelerator pedal or the change in the extent of operation of the accelerator pedal per hour received from the APS 30, when the driver depresses the accelerator pedal to a designated degree or more or rapidly depresses the accelerator pedal. Further, the driver's requested torque determiner no may determine that the driver's intention to accelerate the vehicle is released, when the extent of operation of the accelerator pedal is less than the predetermined limit value or the change in the extent of operation of the accelerator pedal per hour is less than the predetermined limit change value. That is, the driver's requested torque determiner no may determine that the driver's intention to accelerate the vehicle is released, when the driver stops applying pressure to the accelerator pedal.

The driver's requested torque determiner no may calculate the driver's requested torque based on a driving torque map of the vehicle, which is defined according to the open value of the APS 30 and the speed of the vehicle. Based on the driving torque map of the vehicle, the driving torque of the vehicle is determined depending on the open value of the APS 30 and the speed of the vehicle. Further, the driver's requested torque determiner no may finally determine the driver's requested torque in consideration of a corrected torque, which is calculated from the driving torque of the vehicle based on the environment of a driving road. For example, the environment of the driving road may include the slope of the driving road, outdoor air temperature, etc.

The available power amount calculator 130 may calculate an available power amount $P_{avail}$ which is a difference between the existing power consumption amount $P_{total}$ of the electronic components 10 which use the power stored in the high voltage battery 50 and the minimum power consumption amount $P_{min}$ of the electronic components 10 which is required by a vehicle system. Here, the electronic components 10 may be components unrelated to generation of the driving force of the vehicle.

$$P_{avail} = (P_{total} - P_{min})$$

Upon determining that there is the driver's intention to accelerate the vehicle, the available power amount calculator 130 may calculate the existing power consumption amount $P_{total}$ of the electronic components 10, and calculate the minimum power consumption amount $P_{min}$ of the electronic components 10. The available power amount calculator 130 may calculate the minimum power consumption amount $P_{min}$ of the electronic components 10 based on a difference between a set value and a current value of a parameter for controlling the electronic components 10. For example, the available power amount calculator 130 may calculate the minimum power consumption amount of the FATC 13 based on a difference between the set temperature of the FATC 13 (i.e., the set value) and the current indoor temperature of the vehicle (i.e., the current value). The available power amount calculator 130 may transmit information regarding the available power amount $P_{avail}$ to the driving controller 150.

Upon determining that there is the driver's intention to accelerate the vehicle, the driving controller 150 may variably control power applied to the electronic components 10 and power applied to the drive motor 300 of the vehicle. First, the driving controller 150 may variably control the power applied to the electronic components 10 and the power applied to the drive motor 300 of the vehicle, only when the available power amount $P_{avail}$ is greater than the minimum power amount which is capable of affecting the driving force of the vehicle. When the available power amount $P_{avail}$ is excessively small, even if the available power amount $P_{avail}$ is additionally applied to the drive motor 300, the driving force of the vehicle may not be significantly changed. Therefore, in order to substantially improve the driving performance of the vehicle, comparison between the available power amount $P_{avail}$ and the minimum power amount is essentially required.

When the available power amount $P_{avail}$ is greater than the minimum power amount, the driving controller 150 may apply power corresponding to the minimum power consumption amount $P_{min}$ to the electronic components 10. That is to say, the driving controller 150 performs control so that the amount of power consumed by the electronic components 10 is reduced to the minimum power consumption amount $P_{min}$. The driving controller 150 may control the LDC 11, which applies power to the electronic components 10, so as to control the power amount which is consumed by the electronic components 10.

The driving controller 150 may compare the sum of the current torque of the drive motor 300, a torque generated by applying the available power amount $P_{avail}$ to the drive motor 300, and the maximum torque of the engine 200, to the driver's requested torque. When the sum of the current torque of the drive motor 300, the torque generated by applying the available power amount $P_{avail}$ to the drive motor 300, and the maximum torque of the engine 200 is equal to or greater than the driver's requested torque, the driving controller 150 may distribute the available power amount $P_{avail}$ to the drive motor 300 so as to increase the torque of the drive motor 300. Here, the maximum torque of the engine 200 may mean the maximum torque of the engine 200 at the time of partial-load control of the engine 200, which is defined in advance depending on the RPM of the engine 200. The driving modes of the engine 200 of the vehicle are roughly classified into two modes. One mode is a partial-load driving mode and the other mode is a full-load driving mode. In the partial-load driving mode, control is performed based on the optimum air-fuel ratio, and in this mode, fuel efficiency, waste discharge and torque accuracy are excellent. Here, the optimum air-fuel ratio means the ideal mass ratio of air to a fuel for complete combustion, and generally corresponds to 14.7:1. In the full-load driving mode, the output of the engine 200 is considered important, and in this mode, because control is performed in the state in which a throttle is completely opened, the output of the engine 200 is improved but fuel efficiency, waste discharge and torque accuracy are low compared to the partial-load driving mode.

In the distribution of the available power amount $P_{avail}$ to the drive motor 300, the driving controller 150 may determine how much of the available power amount $P_{avail}$ is distributed to the drive motor 300 so as to satisfy the driver's requested torque.

In one example, the driving controller 150 may apply a portion of the available power amount $P_{avail}$ to the drive motor 300 so that the drive motor 300 generates torque corresponding to a value acquired by subtracting the maximum torque of the engine 200 from the driver's requested torque. The driving controller 150 may apply a portion of the remainder of the available power amount $P_{avail}$ to the HSG 400. Alternatively, the driving controller 150 may apply the remainder of the available power amount $P_{avail}$ to the electronic components 10.

In another example, when the sum of the current torque of the drive motor 300, the torque generated by applying the available power amount $P_{avail}$ to the drive motor 300, and the maximum torque of the engine 200 is less than the driver's requested torque, the driving controller 150 may distribute the available power amount $P_{avail}$ to the drive motor 300 so as to increase the torque of the drive motor 300. Here, the driving controller 150 may satisfy the driver's requested torque through full-load control of the engine 200. The sum of the current torque of the drive motor 300, the torque generated by applying the available power amount $P_{avail}$ to the drive motor 300, and the maximum torque of the engine 200, which is less than the driver's requested torque, may mean that, even when additionally applying the available power amount $P_{avail}$ to the drive motor 300, the driver's requested torque may not be satisfied. Therefore, the driving controller 150 may satisfy the driver's requested torque through full-load control of the engine 200 in spite of low fuel efficiency. Here, the driving controller 150 may apply all of the available power amount $P_{avail}$ to the drive motor 300, or may apply only a portion of the available power amount $P_{avail}$ to the drive motor 300.

When the driver's requested torque determiner no determines that the driver's intention to accelerate the vehicle is released, the driving controller 150 may apply power corresponding to the existing power consumption amount $P_{total}$ of the electronic components 10 to the electronic components 10. That is, because it is necessary to distribute the existing power consumed by the electronic components 10 to the drive motor 300 due to release of the driver's request to accelerate the vehicle, the driving controller 150 may control the electronic components 10 to consume the existing power consumption amount $P_{total}$.

According to one embodiment of the present invention, in order to satisfy the driver's requested torque, the engine 200 may be controlled to satisfy the optimum air-fuel ratio, and the power which would otherwise be consumed by the electronic components 10 may be distributed to the drive motor 300, thereby being capable of improving the acceleration performance of the vehicle. The engine 200 may be controlled to satisfy the optimum air-fuel ratio, thereby being capable of preventing deterioration in fuel efficiency of the vehicle.

According to one embodiment of the present invention, the power, which would otherwise be consumed by the electronic components 10, is not unconditionally distributed to the drive motor 300, but may be distributed to the drive motor 300 based on the available power amount while maintaining the minimum power consumption amount required by the electronic components 10 so as to implement generation of an additional torque in the drive motor 300.

Figure 3:
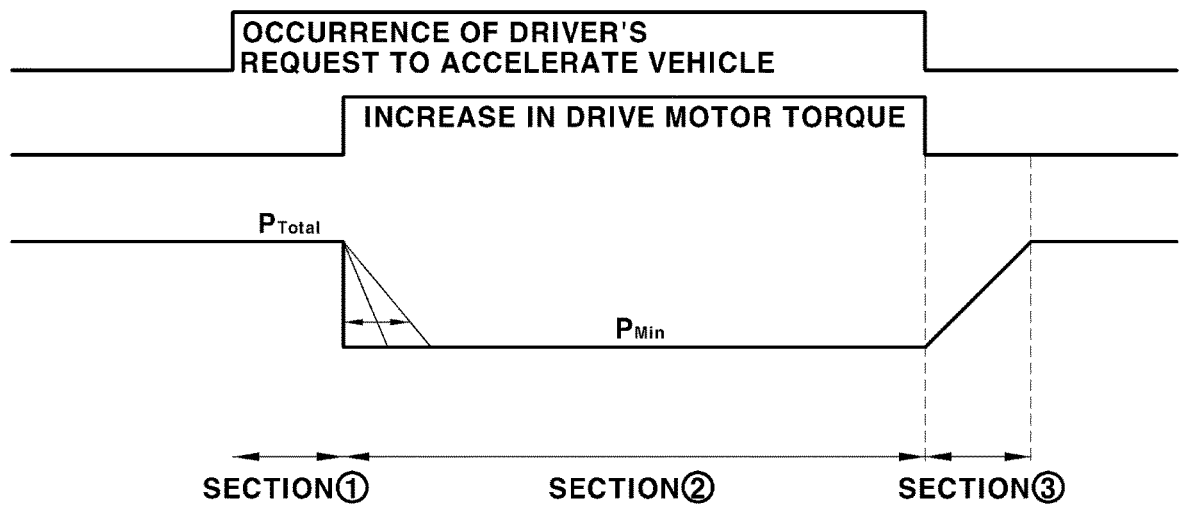
FIG. 3 is a view illustrating respective sections of a process for controlling power consumption of a high voltage battery according to one embodiment of the present invention.
Figure 4:
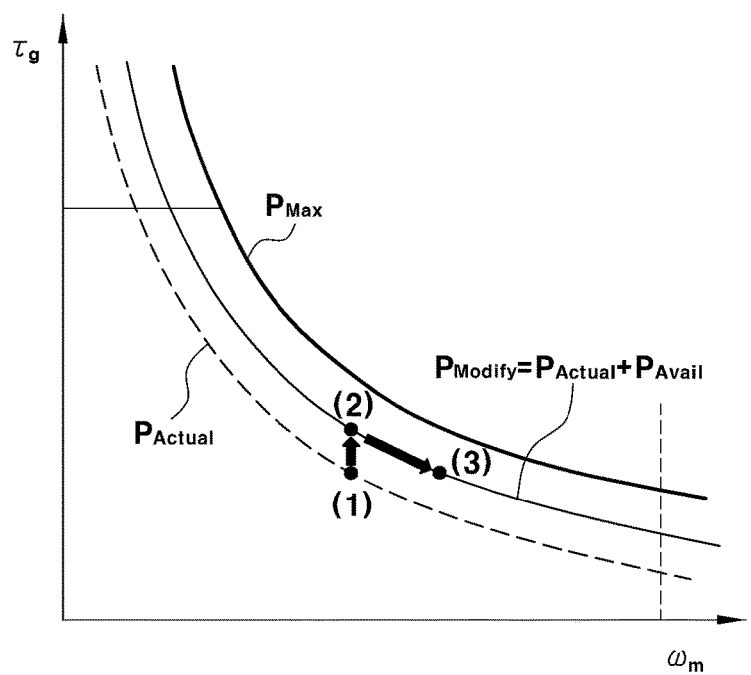
FIG. 4 is a graph illustrating torque control of a drive motor according to one embodiment of the present invention.

FIG. 3 is a view illustrating respective sections of a process for controlling power consumption of a high voltage battery according to one embodiment of the present invention, and FIG. 4 is a graph illustrating torque control of a drive motor according to one embodiment of the present invention.

Referring to FIGS. 1, 3 and 4, in section ①, the driver's requested torque determiner no may determine a driver's request to accelerate the vehicle. After the determination of the driver's request to accelerate the vehicle, the driver's requested torque determiner no may calculate a driver's requested torque. Further, the available power amount calculator 130 may calculate the existing power consumption amount $P_{total}$ of the electronic components 10, the minimum power consumption amount $P_{min}$ of the electronic components 10, and an available power amount $P_{avail}$. Because section ① is a section before the distribution of the available power amount $P_{avail}$ is controlled, the output of the drive motor 300 is not yet changed (the point (1) of FIG. 4 is maintained). That is, the output of the drive motor may be $P_{Actual}$.

In section ②, the driving controller 150 may increase the torque of the drive motor 300. That is, the driving controller 150 may distribute the available power amount $P_{avail}$ to the drive motor 300 so as to increase the torque of the drive motor 300, thereby being capable of improving the acceleration performance of the vehicle. The driving controller 150 may control the power applied to the electronic components 10 so that the power amount consumed by the electronic components 10 becomes the minimum power consumption amount $P_{min}$. In section ②, the distribution of the available power amount $P_{avail}$ is controlled, and thus the output of the drive motor 300 may be changed from the point (1) to the point (2) of FIG. 4. That is, the output of the drive motor 300 may be modified to a power amount $P_{Modify}$, which is acquired by adding the available power amount $P_{avail}$ to the power amount $P_{Actual}$. The modified power amount $P_{Modify}$ may mean the modified output of the drive motor 300. Unless the driver's request to accelerate the vehicle is released, the drive motor 300 may be operated based on the modified output (operated from the point (2) to the point (3)).

By the end of section ②, the driver's requested torque determiner no may detect that the driver's request to accelerate the vehicle is released. In section ③, with the release of the driver's request to accelerate the vehicle, the driving controller 150 may re-distribute the additional power, distributed to the drive motor 300, to the electronic components 10. That is, the driving controller 150 may control the power amount applied to the electronic components 10 based on the existing power consumption amount $P_{total}$. Therefore, the torque generated by the drive motor 300 may be decreased.

Figure 5:
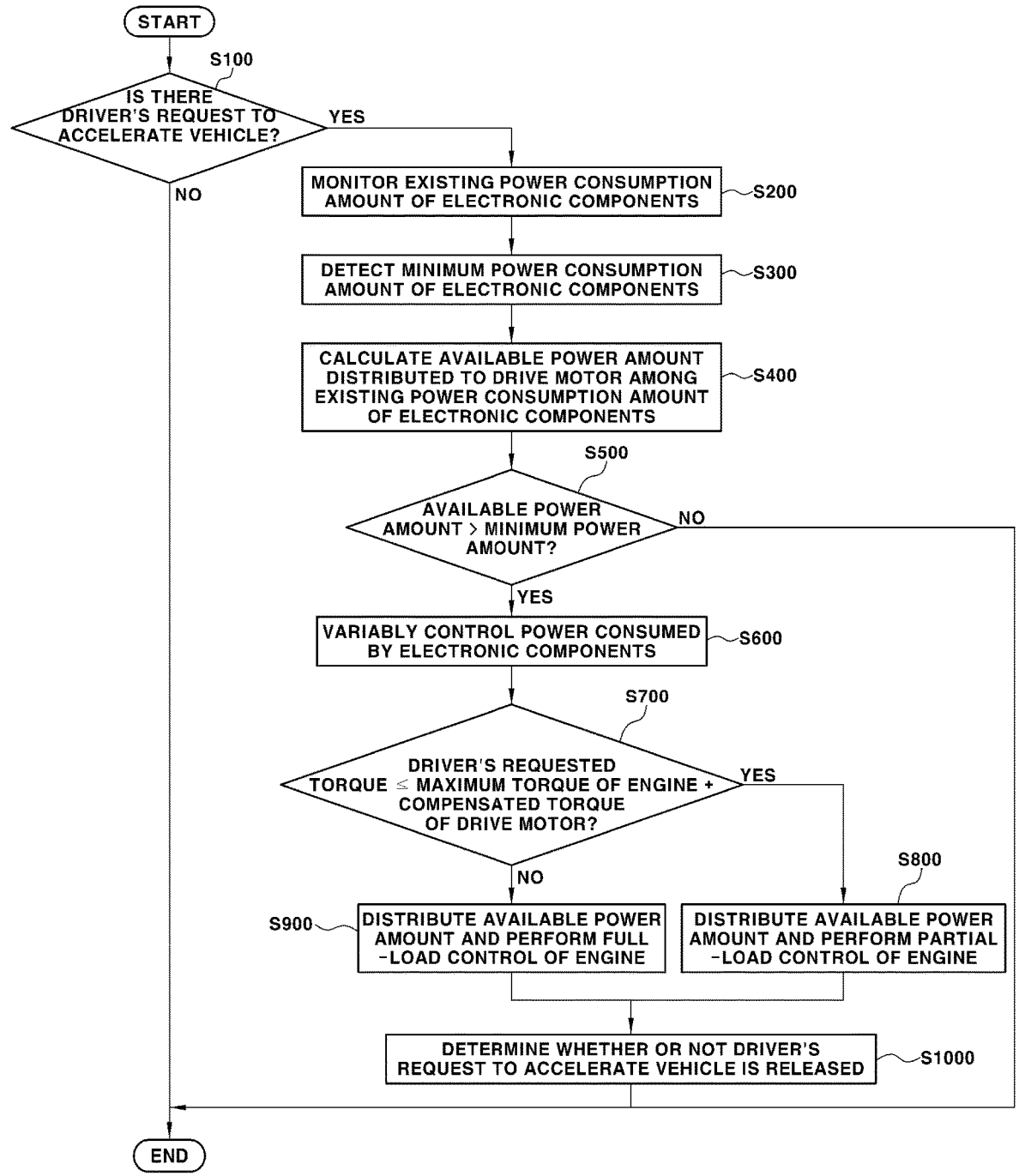
FIG. 5 is a flowchart illustrating a method for controlling power consumption of a high voltage battery according to one embodiment of the present invention.

FIG. 5 is a flowchart illustrating a method for controlling power consumption of a high voltage battery according to one embodiment of the present invention. In the interests of brevity of description, a redundant description will be omitted.

Referring to FIG. 5, the controller may confirm whether or not there is a driver's request to accelerate the vehicle by detecting the driver's extent of depression of the accelerator pedal and/or whether or not the driver changes the driving mode of the vehicle. When there is no driver's request to accelerate the vehicle, control of the distribution of additional power to the drive motor may not be performed (S100).

When there is the driver's request to accelerate the vehicle, the controller may monitor the existing power consumption amount of the electronic components. The controller may calculate the existing power consumption amount, i.e., the total power consumption amount of a plurality of electronic components (S200).

Thereafter, the controller may calculate the minimum power consumption amount of the plurality of electronic components. The controller may calculate the available power amount by subtracting the minimum power consumption amount of the electronic components from the existing power consumption amount of the electronic components. The available power amount may mean a portion of the power consumed by the electronic components, capable of being distributed to the drive motor (S300 and S400).

The controller may compare the available power amount with the minimum power amount in order to improve the acceleration performance of the vehicle. When the available power amount is equal to or less than the minimum power amount, even if the available power amount is additionally applied to the drive motor, it is difficult to improve the driving performance of the vehicle and thus control of the distribution of the power amount to the drive motor may not be performed (S500).

When the available power amount is greater than the minimum power amount, the controller may variably control the amount of power consumed by the electronic components. In more detail, the controller may control the electronic components to consume only the minimum amount of power (S600).

The controller may determine the distribution ratio of the available power amount to the drive motor, and compare the sum of the maximum torque of the engine and the compensated torque of the drive motor to the driver's requested torque. Here, the maximum torque of the engine may mean the maximum torque of the engine at the time of partial-load control of the engine, which is defined in advance depending on the RPM of the engine. The compensated torque of the drive motor may mean a torque generated by the drive motor when the available power amount is additionally applied to the drive motor (S700).

When the sum of the maximum torque of the engine and the compensated torque of the drive motor is equal to or greater than the driver's requested torque, the controller may apply the available power amount to the drive motor while maintaining the partial-load control as a method for controlling the engine. That is, the controller may satisfy a torque corresponding to the driver's requested torque by increasing the torque generated by the drive motor while maintaining the driving state of the vehicle so as to realize a fuel efficiency based on the optimum air-fuel ratio of the vehicle. Here, the controller may again apply the remainder of the available power amount, having satisfied the driver's requested torque, to the electronic components 10. Particularly, the controller may apply only a portion of the available power amount, required to satisfy the driver's requested torque, to the drive motor (S800).

When the sum of the maximum torque of the engine and the compensated torque of the drive motor is less than the driver's requested torque, the controller may change the method for controlling the engine from partial-load control to full-load control. When the driver's requested torque is not satisfied even through full-load control of the engine, the controller may increase the amount of torque generated by the drive motor by applying the available power amount to the drive motor (S900).

The controller may constantly monitor whether or not the driver's request to accelerate the vehicle is released. When the driver's request to accelerate the vehicle is released, the controller may stop control of the distribution of power to the drive motor (S1000).

As is apparent from the above description, embodiments of the present invention provide a system and method for controlling power consumption of a high voltage battery which may control an engine to satisfy the optimum air-fuel ratio and distribute power consumed by electronic components to a drive motor in order to satisfy a driver's requested torque, thereby being capable of improving the acceleration performance of a vehicle. The engine is controlled to satisfy the optimum air-fuel ratio, thereby being capable of preventing deterioration in fuel efficiency of the vehicle.

Further, the power, which would otherwise be consumed by the electronic components, is not unconditionally distributed to the drive motor, but may be distributed to the drive motor based on an available power amount while maintaining the minimum power consumption amount required by the electronic components, thereby being capable of implementing generation of an additional torque in the drive motor.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling power consumption of a high voltage battery, the system comprising:
   a driver's requested torque determiner configured to determine a driver's intention to accelerate a vehicle and to calculate a driver's requested torque;
   an available power amount calculator configured to calculate an available power amount of a difference between an existing power consumption amount of electronic components configured to use the high voltage battery as a power source and a minimum power consumption amount of the electronic components required by a vehicle system, wherein the electronic components are components unrelated to generation of a driving force of the vehicle; and
   a driving controller configured to:
     variably control power applied to the electronic components and power applied to a drive motor of the vehicle upon determining the driver's intention to accelerate the vehicle; and
     distribute a portion of the available power amount to the drive motor so as to improve an acceleration performance of the vehicle when the available power amount is greater than a minimum power amount sufficient to affect the driving force of the vehicle.

2. The system of claim 1, wherein the driving controller is configured to distribute the available power amount to the drive motor to increase a torque of the drive motor when a sum of a current torque of the drive motor, a torque generated by applying the available power amount to the drive motor, and a maximum torque of an engine is greater than the driver's requested torque.

3. The system of claim 2, wherein the maximum torque of the engine is the maximum torque of the engine at a time of partial-load control of the engine defined in advance based on an RPM of the engine.

4. The system of claim 2, wherein:
the driving controller is configured to apply the portion of the available power amount to the drive motor so that the drive motor generates a torque corresponding to a value acquired by subtracting the maximum torque of the engine from the driver's requested torque; and
the driving controller is configured to apply a remaining portion of the available power amount to a hybrid starter generator.

5. The system of claim 1, wherein the driving controller is configured to distribute the available power amount to the drive motor to increase a torque of the drive motor and to satisfy the driver's requested torque through full-load control of an engine when a sum of a current torque of the drive motor, a torque generated by applying the available power amount to the drive motor, and a maximum torque of the engine is less than the driver's requested torque.

6. The system of claim 1, wherein the driving controller is configured to apply power corresponding to the minimum power consumption amount to the electronic components upon determining the driver's intention to accelerate the vehicle.

7. The system of claim 1, wherein the driver's requested torque determiner is configured to determine the driver's intention to accelerate the vehicle based on an absolute value of or a change in an extent of operation of an accelerator pedal by a driver.

8. The system of claim 7, wherein the driver's requested torque determiner is configured to determine the driver's intention to accelerate the vehicle when the extent of operation of the accelerator pedal is equal to or greater than a predetermined limit value or the change in the extent of operation of the accelerator pedal per hour is equal to or greater than a predetermined limit change value, the extent of operation of the accelerator pedal being detected by an accelerator position sensor.

9. The system of claim 1, wherein the driver's requested torque determiner is configured to finally determine the driver's requested torque in consideration of a corrected torque calculated from a driving torque determined based on an open value of an accelerator position sensor and a speed of the vehicle based on an environment of a driving road.

10. The system of claim 1, wherein the driver's requested torque determiner is configured to determine a release of the driver's intention to accelerate the vehicle when an extent of operation of an accelerator pedal is less than a predetermined limit value or a change in the extent of operation of the accelerator pedal per hour is less than a predetermined limit change value, the extent of operation of the accelerator pedal being detected by an accelerator position sensor.

11. The system of claim 10, wherein the driving controller is configured to apply power corresponding to the existing power consumption amount of the electronic components to the electronic components upon determining the release of the driver's intention to accelerate the vehicle.

12. The system of claim 1, wherein the available power amount calculator is configured to calculate the minimum power consumption amount of the electronic components based on a difference between a set value and a current value of a parameter for controlling the electronic components.

13. A method for controlling power consumption of a high voltage battery, the method comprising:

determining a point in time of a driver's request to accelerate a vehicle and calculating a driver's requested torque;
calculating an existing power consumption amount of electronic components configured to use the high voltage battery as a power source and a minimum power consumption amount of the electronic components required by a vehicle system, wherein the electronic components are components unrelated to generation of a driving force of the vehicle;
calculating an available power amount of a difference between the existing power consumption amount of the electronic components and the minimum power consumption amount of the electronic components, wherein calculating the available power amount comprises determining the available power amount is greater than a minimum power amount sufficient to affect the driving force of the vehicle;
controlling the electronic components based on the minimum power consumption amount of the electronic components;
controlling power applied to a drive motor of the vehicle based on the available power amount; and
distributing a portion of the available power amount to the drive motor so as to improve an acceleration performance of the vehicle when the available power amount is greater than the minimum power amount sufficient to affect the driving force of the vehicle.

14. The method of claim 13, wherein:
controlling the power applied to the drive motor of the vehicle comprises distributing the available power amount to the drive motor to increase a torque of the drive motor when a sum of a current torque of the drive motor, a torque generated by applying the available power amount to the drive motor, and a maximum torque of an engine is greater than the driver's requested torque; and
the maximum torque of the engine is the maximum torque of the engine at a time of partial-load control of the engine defined in advance depending on an RPM of the engine.

15. The method of claim 14, wherein distributing the available power amount to the drive motor to increase the torque of the drive motor comprises:
applying the portion of the available power amount to the drive motor so that the drive motor generates a torque corresponding to a value acquired by subtracting the maximum torque of the engine from the driver's requested torque; and
applying a remaining portion of the available power amount to a hybrid starter generator.

16. The method of claim 13, wherein controlling the power applied to the drive motor of the vehicle comprises distributing the available power amount to the drive motor to increase a torque of the drive motor and to satisfy the driver's requested torque through full-load control of an engine when a sum of a current torque of the drive motor, a torque generated by applying the available power amount to the drive motor, and a maximum torque of the engine is less than the driver's requested torque.

17. The method of claim 13, wherein determining the point in time of the driver's request to accelerate the vehicle and calculating the driver's requested torque comprises determining a driver's intention to accelerate the vehicle when an extent of operation of an accelerator pedal is equal to or greater than a predetermined limit value or a change in the extent of operation of the accelerator pedal per hour is equal to or greater than a predetermined limit change value, the extent of operation of the accelerator pedal being detected by an accelerator position sensor.

18. The method of claim 13, further comprising changing a power consumption amount applied to the electronic components to the existing power consumption amount of the electronic components upon determining a release of the driver's request to accelerate the vehicle.

\* \* \* \* \*